May 18, 1948.　　　G. B. SIMONSON　　　2,441,775
BELT SHIFTER
Filed Aug. 23, 1946　　　2 Sheets-Sheet 1

INVENTOR
George B. Simonson,
BY
ATTORNEYS.

May 18, 1948. G. B. SIMONSON 2,441,775
BELT SHIFTER
Filed Aug. 23, 1946 2 Sheets-Sheet 2
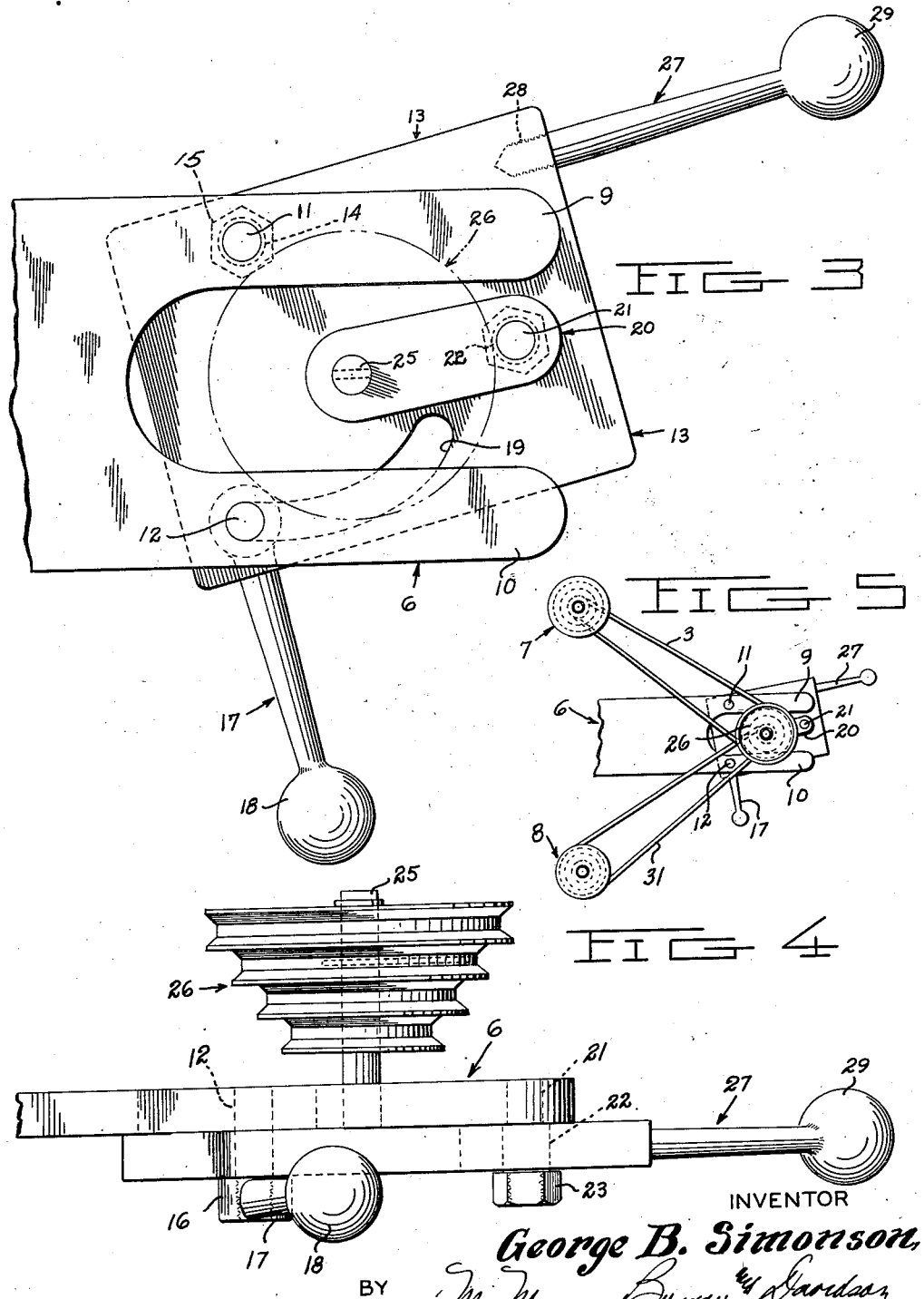
INVENTOR
George B. Simonson,
BY
ATTORNEYS Patented May 18, 1948

2,441,775

UNITED STATES PATENT OFFICE 2,441,775

BELT SHIFTER

George B. Simonson, Hawthorne, Calif.

Application August 23, 1946, Serial No. 692,428

3 Claims. (Cl. 74—242.10)

This invention relates generally to means used in the shifting of machine belts to change the speed of operation of a machine; and more particularly to an intermediate stepped pulley assembly adapted to be installed between the two driving and driven pulleys of such as a drill press or the like machine, the primary object of the invention being to provide a device of this character which greatly facilitates the shifting of the belts from one step of the intermediate pulley to another to vary the driven speed of the machine, said device having means enabling the stepped pulley to be moved toward the driving and driven pulleys of the machine to slacken the belts sufficiently to permit easy shifting thereof from one step of the intermediate pulley thereof without prying the belts out of the pulley grooves.

Another important object of this invention is to provide a device of the character indicated above which has means, operative upon withdrawing the stepped pulley away from the driving and driven pulleys of the machine for tightening the belts after a shift thereof, for automatically centering the stepped pulley between the driving and driven pulleys, as said stepped pulley is moved in the belt tightening direction, so that equal tension on the two belts is obtained.

Another important object of this invention is to provide a device of the character indicated above in which the stepped pulley is manipulated into both the belt slackening and belt tightening positions by means of a single hand lever, and in which a single hand lever is employed for locking the stepped pulley in adjusted belt tightening position, and for releasing the stepped pulley therefrom.

A further object of my invention is to provide a device of the character indicated above in which the stepped intermediate pulley can be arranged relative to the driving and driven pulleys, so that the belts can be changed easily and readily.

Other important objects and advantageous features of this invention will be apparent in the following detailed description and appended drawings, wherein merely for the purposes of disclosure herein, a specific but non-limitative embodiment of this invention is set forth.

In the drawings—

Figure 3 is a top plan view with the stepped pulley removed.

Figure 4 is a side elevation, looking from left to right in Figure 2, and,

Figure 5 is a fragmentary plan view, on a reduced scale, showing installation of the device on a machine between the driving and driven pulleys thereof.

Figure 1:
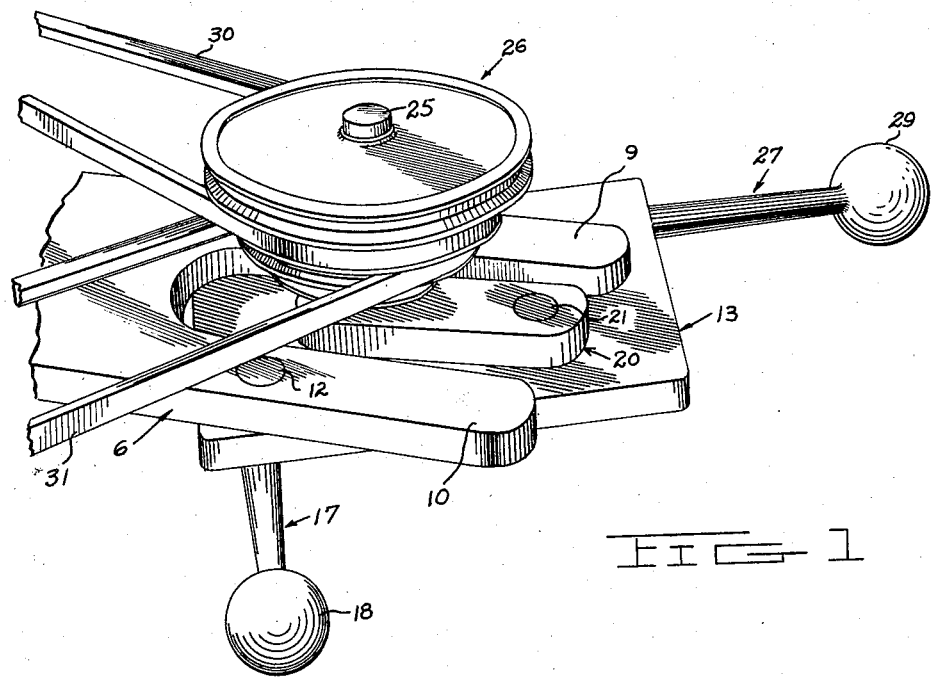
Figure 1 is a general top perspective view.

In using the intermediate stepped or cone pulley devices now available for lowering or raising the speed of operation of such machine as drill presses and the like, it is necessary to employ extremely short V-belts, the shifting of which on the intermediate pulley is a very difficult operation. Further, such intermediate pulley devices are fixedly installed on the center line of the driving and driven pulleys of the machine, so that, in the case of a drill press, for example, it is not possible to raise or lower the head of the drill press, as may be desirable or necessary in certain circumstances.

The device of the present invention eliminates these difficulties, when applied to a drill press or any other machine employing driving and driven pulleys, whether the V-type or flat type of belts are used, by means of the structural and functional arrangements of parts hereinafter disclosed, which include a floating mounting of the stepped pulley.

Referring to the drawings in detail, the numeral 6 generally designates the base of the device disclosed herein, which is in the form of a bracket attachable to a suitable part of the frame of any machine (not shown) with which the present device may be associated, in a position substantially midway between the driving and driven pulleys 7 and 8 thereof, as shown in Figure 5.

The fore end of the base bracket 6 is bifurcated or forked to define the substantially parallel arms 9 and 10, which are vertically traversed near their inner ends by the plate pivot stud 11 and the tightening stud 12, respectively, these studs having their heads preferably flush in the tops of the arms and having their shanks depending to traverse the generally rectangular plate, which is generally designated 13.

The shank of the plate pivot stud 11 includes an enlarged diameter shoulder 14 which turns in a conforming opening formed adjacent to one corner of the plate 13, as indicated in Figure 3, the lower end of said shoulder projecting below the bottom of the plate for contact by the nut 15 which is threaded on the lower end of the shank, whereby swinging of the plate 13 relative to the base 6 is not restricted although the nut 15 may be fully tightened.

The shank of the tightening stud 12 is plain and has threaded thereon below the plate 13 a nut 16 adapted to join against the bottom of said plate to lock the plate 13 and base 6 together in selected positions. The nut 16 has a lever handle 17 having an enlarged ball handle 18.

The tightening stud 12 depends through and can move along a slot 19 formed through the plate 13 and curved with the pivot stud 11 as its center of curvature.

On top of the plate 13 and positioned between the arms 9 and 10 of the base 6 is the carrier 20 of about the same cross section and width as the base arms 9 and 10 and about half their length. The forward end of the carrier is traversed by a carrier stud 21 which depends through a hole formed in the forepart of the plate 13. The shank of the stud 21 has an enlarged shoulder 22 comfortably received by the hole in the plate and depending therebelow, as shown in Figure 2, with a nut 23 tightened on the lower part of the stud against the shoulder 22, whereby clearance between the nut 23 and the plate 13 is provided to insure free movement of the carrier stud 21 and the nut 23 relative to the plate 13.

Rising from the inner end of the carrier 20 is the stub shaft 25 rotatably carrying a cone or stepped intermediate pulley 26. The plate 13 has a lever handle 27 threaded, as indicated at 28, in the fore edge of the plate 13 near the same side as the plate pivot stud 11, with a ball handle 29 at its outer end. The arms 9 and 10 prevent the carrier 20 from over pivoting to either side, and provide surfaces, against which the plate 13 will bear under the tension of the belts.

Figure 2:
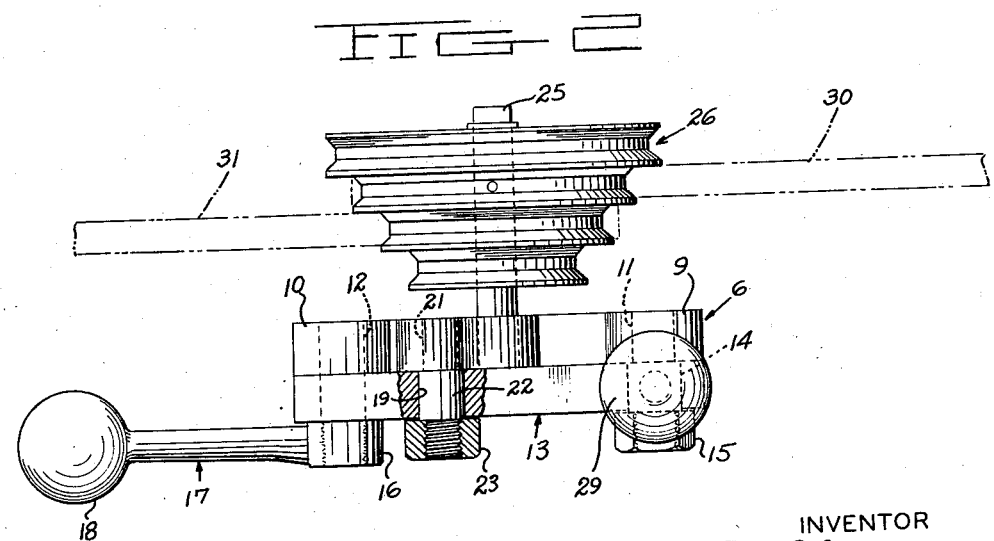
Figure 2 is an end elevation, looking from right to left in Figure 1, and partly broken away to show the extended shoulder formation of certain of the pivot studs.

As indicated in Figures 1, 2 and 5, the driving pulley 7 may have its belt 30 in one of the upper steps or grooves of the stepped pulley 26, with the belt 31 of the driven pulley in a lower step or groove of the pulley 26.

To operate the device of the invention from the operated position shown in Figure 5, wherein the belts 30 and 31 are equally tensioned in operating relation, the handle 17 on the tightening nut 16 is swung in the loosening direction about a quarter of a turn or more, so as to permit the tension of the belts 30 and 31 to pull or pivot the plate 13, and hence the carrier 20 and stepped pulley 26 toward the pulleys 7 and 8.

After shifting the belts for the desired speed change, the lever 27 is swung in a direction tending to tighten the belts 30 and 31, so that the carrier 20, which is free on its pivot stud 21, can automatically adjust itself to put exactly the same tension on each of the belts 30 and 31. The handle 17 is then swung in the direction to tighten the nut 16 and lock the plate 13 and base 6 together in the new position.

It will be evident from the foregoing, that the device of the present invention is to be mounted on the machine with which it is used, in a position somewhat displaced from rather than on the center line between the two pulleys of the machine.

It is also obvious that the belt speed changes can be made more easily and quickly with the stepped pulley of the present device in the belt loosening position, and the belts are subjected to less wear and tear, since the belts then do not require to be pried out of and over the edges of the pulley grooves in making the changes.

And furthermore, the above specification shows clearly, that the belts 30 and 31 can be easily removed and replaced, after the plate 13 is adjusted, so that the two belts are slackened.

The above described device is also adapted to set the intermediate pulley, so that the belts are arranged to function in the most advantageous way in relation to the load imposed on the driven pulley.

What is claimed is:

1. An intermediate stepped pulley device for use on a machine having a driving pulley and a driven pulley each having a belt, said device comprising a relatively stationary base adapted to be mounted on said machine between and at one side of said driving and driven pulleys, a plate pivoted on said base, a carrier freely pivoted on said plate and carrying a stepped pulley at one side of its pivotal point in grooves of which the belts of the driving and driven pulleys are adapted to be selectively positioned, handled locking means for holding said plate in a selected pivoted position relative to said base, and handled means for swinging said plate relative to said base while said locking means is in unlocked position, for moving said plate and hence said carrier and stepped pulley in a direction toward the driving and driven pulleys so as to loosen their belts to enable easily shifting the belts to other grooves of said stepped pulley or removing and replacing said belts, and in a direction away from the driving and driven pulleys so as to tighten the belts and permit said carrier to pivot to carry said stepped pulley to a position in which the tightening tension on the belts is equalized.

2. An intermediate stepped pulley device for use with a machine having belt equipped driving and driven pulleys, said device comprising a bracket for stationary attachment to the machine at one side of an intermediate said driving and driven pulleys, said bracket comprising a flat base positioned in a plane parallel to the belts and bifurcated at its outer end to define a pair of spaced arms, a flat plate positioned beneath said arms, a plate pivot stud depending from one of said arms and traversing said plate for pivoting said plate on said base, a tightening stud depending from the other of said arms through and movable along a slot formed in said plate, said slot being curved with said plate pivot stud as its center of curvature, a handle equipped locking nut on the lower end of said tightening stud adapted to be turned thereon against the underside of said plate to lock said plate and said base together in a selected pivoted position of said plate, a floating carrier bar on said plate between the arms of said base, a carrier pivot pivoting one end of said carrier bar to swing crosswise between said arms, a stepped pulley on the opposite end of said carrier bar in grooves of which said driving and driven pulley belts are adapted to be selectively positioned, and a handle on said plate enabling said plate to be swung on said plate pivot stud relative to said base, when said locking nut is loosened, in a direction toward said driving and driven pulleys for loosening their belts to enable them to be shifted to other grooves of said stepped pulley, and in the opposite direction away from said driving and driven pulleys for tightening the belts and to permit said floating carrier to swing relative to said base and said plate into a position in which the tightening tension is equalized between the belts.

3. An intermediate stepped pulley device for use with a machine having belt equipped driving and driven pulleys, said device comprising a bracket for stationary attachment to the machine at one side of an intermediate said driving and driven pulleys, said bracket comprising a flat base positioned in a plane parallel to the belts and bifurcated at its outer end to define a pair of spaced arms, a flat plate positioned beneath said arms, a plate pivot stud depending from one of said arms and traversing said plate for pivoting said plate on said base, a tightening stud depending from the other of said arms through and movable along a slot formed in said plate, said slot being curved with said plate pivot stud as its center of curvature, a handle equipped locking nut on the lower end of said tightening stud adapted to be turned thereon against the underside of said plate to lock said plate and said base together in a selected pivoted position of said plate, a floating carrier bar on said plate between the arms of said base, a carrier pivot pivoting one end of said carrier bar to swing crosswise between said arms, a stepped pulley on the opposite end of said carrier bar in grooves of which said driving and driven pulley belts are adapted to be selectively positioned, and a handle on said plate enabling said plate to be swung on said plate pivot stud relative to said base, when said locking nut is loosened, in a direction toward said driving and driven pulleys for loosening their belts to enable them to be shifted to other grooves of said stepped pulley, and in the opposite direction away from said driving and driven pulleys for tightening the belts and to permit said floating carrier to swing relative to said base and said plate into a position in which the tightening tension is equalized between the belts, said arms forming a strengthening support for the plate under the tension of the belts.

GEORGE B. SIMONSON.